United States Patent
Thoreau et al.

(10) Patent No.: US 10,652,577 B2
(45) Date of Patent: May 12, 2020

(54) METHOD AND APPARATUS FOR ENCODING AND DECODING LIGHT FIELD BASED IMAGE, AND CORRESPONDING COMPUTER PROGRAM PRODUCT

(71) Applicant: THOMSON Licensing, Issy-les-Moulineaux (FR)

(72) Inventors: Dominique Thoreau, Cesson Sévigné (FR); Mikael Le Pendu, Rennes (FR); Martin Alain, Rennes (FR); Mehmet Turkan, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 71 days.

(21) Appl. No.: 15/759,215

(22) PCT Filed: Sep. 14, 2016

(86) PCT No.: PCT/EP2016/071716
§ 371 (c)(1),
(2) Date: Mar. 10, 2018

(87) PCT Pub. No.: WO2017/046175
PCT Pub. Date: Mar. 23, 2017

(65) Prior Publication Data
US 2018/0255319 A1    Sep. 6, 2018

(30) Foreign Application Priority Data

Sep. 14, 2015   (EP) ..................................... 15306408

(51) Int. Cl.
*H04N 19/597*   (2014.01)
*H04N 19/15*   (2014.01)
(Continued)

(52) U.S. Cl.
CPC ......... *H04N 19/597* (2014.11); *G06T 15/205* (2013.01); *H04N 13/161* (2018.05);
(Continued)

(58) Field of Classification Search
CPC combination set(s) only.
See application file for complete search history.

(56) References Cited

U.S. PATENT DOCUMENTS 6,191,808 B1 * 2/2001 Katayama ............. G06T 15/205
348/39
6,608,622 B1   8/2003 Katayama et al.
(Continued)

FOREIGN PATENT DOCUMENTS

JP   2007180982   7/2007
WO  WO2014010584   1/2014

OTHER PUBLICATIONS

Hata et al., "Epipolar Geometry Estimation and Its Application to Image Coding", 1999 International Conference on Image Processing (ICIP'99), Kobe, Japan, Oct. 24, 1999, pp. 472-476.
(Continued)

*Primary Examiner* — Alexander Gee
(74) *Attorney, Agent, or Firm* — Brian J. Dorini, Esquire; Robert D. Shedd, Esquire (57) ABSTRACT

The present disclosure generally relates to a method for predicting at least one block of pixels of a view (170) belonging to a matrix of views (17) obtained from light-field data belong with a scene, According to present disclosure, the method is implemented by a processor and comprises for at least one pixel to predict of said block of pixels: —from said matrix of views (17), obtaining (51) at least one epipolar plane image (EPI) belong with said at least one pixel to predict, —among a set of bidirectional prediction modes, determining (52) at least one optimal bidirectional
(Continued)

prediction mode from a set of previous reconstructed pixels neighbouring said at least one pixel to predict in said at least one epipolar plane image, —extrapolating (53) a prediction value of said at least one pixel to predict by using said at least one optimal bidirectional prediction mode.

13 Claims, 5 Drawing Sheets

(51) Int. Cl.
 H04N 19/577 (2014.01)
 G06T 15/20 (2011.01)
 H04N 13/161 (2018.01)
 H04N 19/103 (2014.01)
 H04N 19/172 (2014.01)

(52) U.S. Cl.
 CPC ........... *H04N 19/103* (2014.11); *H04N 19/15* (2014.11); *H04N 19/172* (2014.11); *H04N 19/577* (2014.11)

(56) References Cited

U.S. PATENT DOCUMENTS

| | | | | |
|---|---|---|---|---|
| 2011/0026844 | A1* | 2/2011 | Francois | H04N 19/129 382/233 |
| 2013/0064453 | A1* | 3/2013 | Nagasaka | H04N 5/225 382/190 |
| 2013/0222633 | A1 | 8/2013 | Knight et al. | |
| 2013/0235152 | A1* | 9/2013 | Hannuksela | H04N 19/597 348/43 |
| 2015/0172715 | A1 | 6/2015 | Shimizu et al. | |

OTHER PUBLICATIONS

Xiu et al., "Projective Rectification-Based View Interpolation for Multiview Video Coding and Free Viewpoint Generation", 27th Picture Coding Symposium (PCS) 2009, Chicago, Illinois, USA, May 6, 2009, pp. 1-4.

Deng et al., "Iterative search strategy with selective bi-directional prediction for low complexity multiview video coding", Journal of Visual Communication and Image Representation, vol. 23, No. 3, Apr. 2012, pp. 522-534.

Lu et al., "An Epipolar Geometry-Based Fast Disparity Estimation Algorithm for Multiview Image and Video Coding", IEEE Transactions on Circuits and Systems for Video Technology, vol. 17, No. 6, Jun. 2007, pp. 737-750.

Lin, J., "Combining Epipolar Geometry Based Inter-view Prediction with Fast Inter Frame Direction Predictor for Multi-view Video Coding", National Central University, Department of Communication Engineering, Master's Thesis, Jun. 22, 1998, pp. 1-77. English Abstract.

Ng et al., "Light Field Photography with a Hand-held Plenoptic Camera", Stanford University Computer Science Technical Report, CSTR 2005-02, Apr. 2005, pp. 1-11.

Sabater et al., "Light-Field Demultiplexing and Disparity Estimation", https://hal.archives-ouvertes.fr/hal-00925652/, HAL Id: Hal-00925652, Apr. 8, 014, pp. 1-9.

Anonymous, "Depth for Augmented and Mixed Reality", http://www.pelicanimaging.com/technology/camera.html, 2015, pp. 1-2.

Wanner et al., "Generating EPI Representations of 4D Light Fields with a Single Lens Focused Plenoptic Camera", 7th International Symposium on Visual Computing (ISVC 2011), Las Vegas, Nevada, USA, Sep. 26, 2011, pp. 90-101.

Wiegand et al., "Lagrange Multiplier Selection in Hybrid Video Coder Control", IEEE International Conference on Image processing 2001, Thessaloniki, Greece, Oct. 7, 2001, pp. 542-545.

Georgiev, T., "Historical Light Field", http://www.tgeorgiev.net/, Jan. 2016, pp. 1-7.

Goldluecke et al., "The Variational Structure of Disparity and Regularization of 4D Light Fields", 2013 IEEE Conference on Computer Vision and Pattern Recognition (CVPR), Portland, Oregon, USA, Jun. 23, 2013, pp. 1003-1010.

Bolles et al., "Epipolar-Plane Image Analysis: An Approach to Determining Structure from Motion",International Journal of Computer Vision, vol. 1, Jan. 1987, pp. 7-55.

Zhong et al., "An Automatic Mode Decision Method for Intra Frame Coding and Decoding", International Organisation for Standardization, ISO/IEC JTC1/SC29/WG11, Coding of Moving Pictures and Audio, Document MPEG2001/M7719, Pattaya, Thailand, Dec. 2001, pp. 1-9.

Yang et al., "Fast Intra Mode Selection for Stereo Video Coding Using Epipolar Constraint", 2011 IEEE Visual Communications and Image Processing (VCIP), Tainan, Taiwan, Nov. 6, 2011, pp. 1-4.

Shum et al., "Survey of Image-Based Representations and Compression Techniques", IEEE Transactions on Circuits and Systems for Video Technology, vol. 13, No. 11, Nov. 2003, pp. 1020-1037.

\* cited by examiner

METHOD AND APPARATUS FOR ENCODING AND DECODING LIGHT FIELD BASED IMAGE, AND CORRESPONDING COMPUTER PROGRAM PRODUCT

This application claims the benefit of International Application PCT/EP2016/071716, under 35 U.S.C. § 365, filed on Sep. 14, 2016 which was published in accordance with Article 21(2) on Mar. 23, 2017, in English, and which claims the benefit of European Patent Application No. 15306408.4, filed on Sep. 14, 2015.

1. TECHNICAL FIELD

The present disclosure relates to light field imaging, and to technologies for acquiring and processing light field data. More precisely, the present disclosure generally relates to a method and an apparatus for encoding and decoding a light field based image, and finds applications in the domain of image or video encoding/decoding.

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional image capture devices render a three-dimensional scene onto a two-dimensional sensor. During operation, a conventional capture device captures a two-dimensional (2-D) image representing an amount of light that reaches a photosensor (or photodetector) within the device. However, this 2-D image contains no information about the directional distribution of the light rays that reach the photosensor (which may be referred to as the light field). Depth, for example, is lost during the acquisition. Thus, a conventional capture device does not store most of the information about the light distribution from the scene.

Light field capture devices (also referred to as "light field data acquisition devices") have been designed to measure a four-dimensional (4D) light field of the scene by capturing the light from different viewpoints of that scene. Thus, by measuring the amount of light traveling along each beam of light that intersects the photosensor, these devices can capture additional optical information (information about the directional distribution of the bundle of light rays) for providing new imaging applications by post-processing. The information acquired/obtained by a light field capture device is referred to as the light field data. Light field capture devices are defined herein as any devices that are capable of capturing light field data. There are several types of light field capture devices, among which:
  plenoptic devices, which use a microlens array placed between the image sensor and the main lens, as described in document US 2013/0222633;
  a camera array, where all cameras image onto a single shared image sensor.

The light field data may also be simulated with Computer Generated Imagery (CGI), from a series of 2-D images of a scene each taken from a different viewpoint by the use of a conventional handheld camera.

Light field data processing comprises notably, but is not limited to, generating refocused images of a scene, generating perspective views of a scene, generating depth maps of a scene, generating extended depth of field (EDOF) images, generating stereoscopic images, and/or any combination of these.

Figure 1:
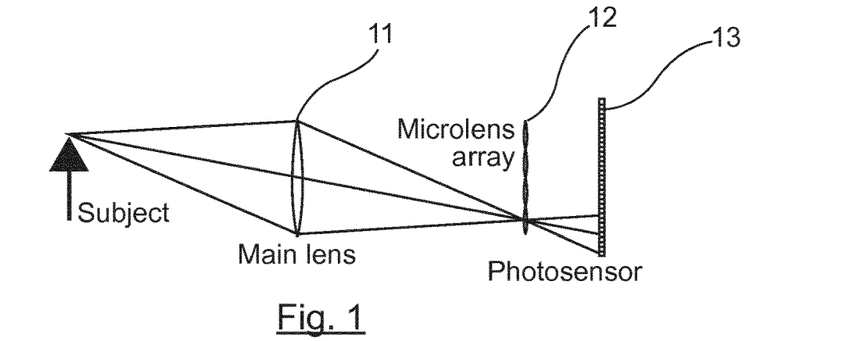
FIG. 1, already presented in relation with prior art, shows the conceptual schematic of a plenoptic camera.

The present disclosure focuses more precisely on light field based image captured by a plenoptic device as illustrated by FIG. 1 disclosed by R. Ng, et al. in "*Light field photography with a hand-held plenoptic camera*" *Standford University Computer Science Technical Report CSTR* 2005-02, no. 11 (April 2005).

Such plenoptic device is composed of a main lens (11), a micro-lens array (12) and a photo-sensor (13). More precisely, the men lens focuses the subject onto (or near) the micro-lens array. The micro-lens array (12) separates the converging rays into an image on the photo-sensor (13) behind it.

Figure 2:
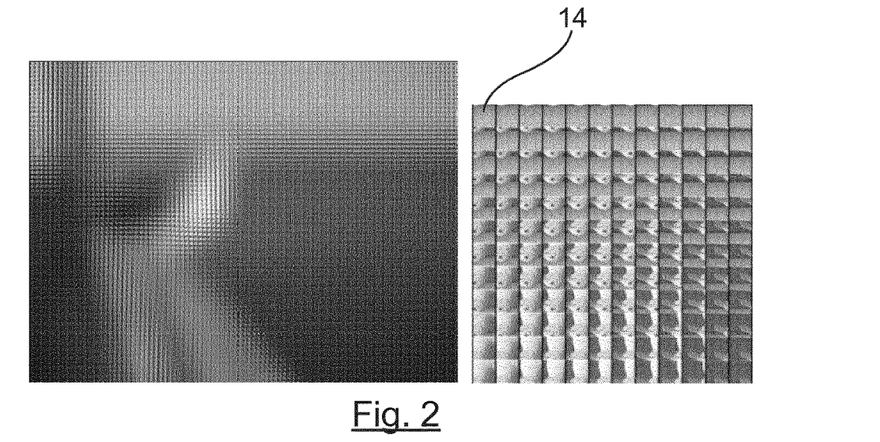
FIG. 2, already presented in relation with prior art, shows an example of picture shot with a plenoptic camera.

A micro-image (14) is the image formed on the photo-sensor behind a considered micro-lens of the micro-lens array (12) as illustrated by FIG. 2 disclosed by http://www.tgeorgiev.net/ where the image on the left corresponds to raw data and the image on the right corresponds to details of micro-images representing in particular a seagull's head. Micro-images resolution and number depend on micro-lenses size with respect to the sensor. More precisely, the micro-image resolution varies significantly depending on devices and applications (from 2×2 pixels up to around 100×100 pixels).

Then, from every micro-image, sub-aperture images are reconstructed, such a reconstruction consists in gathering collocated pixels from every micro-image. The more numerous the micro-lenses, the higher the resolution of sub-aperture images. More precisely, as illustrated by FIG. 3, considering that one micro-lens overlaps N×N pixels of the photo-sensor (15), the N×N matrix of views (17) is obtained by considering that the $i^{th}$ view contains all the L×L $i^{th}$ pixels overlapped by each micro-lens of the micro-lens array (16) comprising L×L micro-lenses, where "×" is a multiplication operator.

Figure 3:
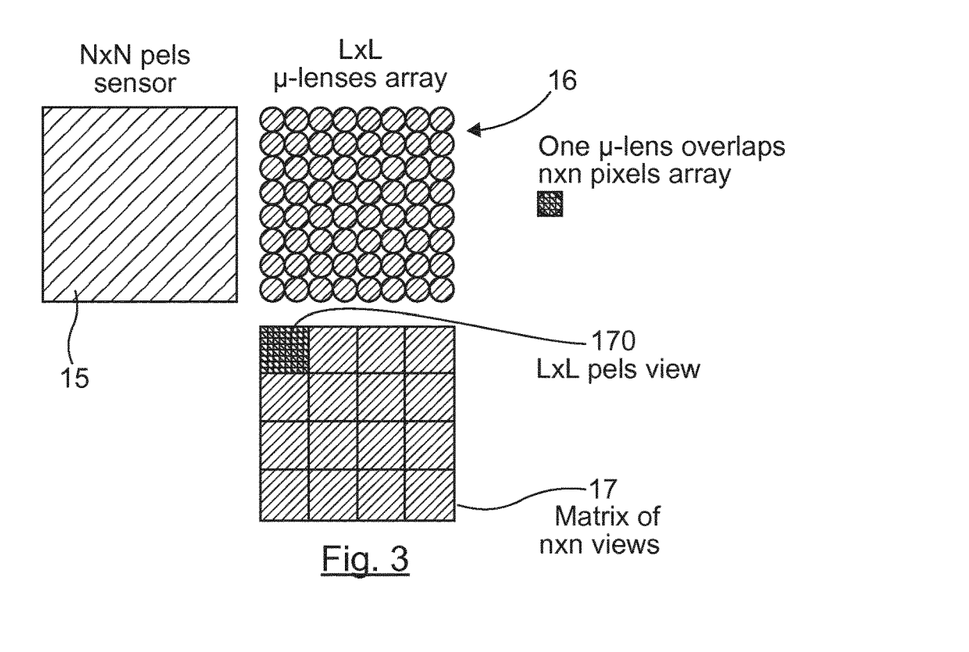
FIG. 3 already presented in relation with prior art, shows respectively a camera sensor (15), et micro-lens array (16) and a matrix of views (17)

More precisely, on FIG. 3, L=8 and N=4, the first view 300 will thus comprises the first of the sixteen pixels covered by each micro-lens of the 64 micro-lenses of the considered micro-lens array.

Sub-aperture images reconstruction required de-mozaicing. Techniques for recovering the matrix of views from raw plenoptic material are currently developed such as the one disclosed by N. Sabater et al. in "*Light field demultiplexing and disparity estimation*" International Conference on Complementary Problems ICCP 2014.

On the opposite to the plenoptic device, camera array devices, such as the Pelican Imaging® camera, deliver directly matrices of views (i.e. without de-mozaicing).

State of Art methods for encoding such light field based images consists in using standard image or video codecs (such as JPEG, JPEG-2000, MPEG4 Part 10 AVC, HEVC). However, such standard codecs are not able to take into account the specificities of light field imaging (aka plenoptic data), which records the amount of light (the "radiance") at every point in space, in every direction.

Indeed, applying the conventional standard image or video codecs (such as JPEG, JPEG-2000, MPEG4 Part 10 AVC, HEVC) delivers conventional imaging formats.

However, among the many new light field imaging functionalities provided by these richer sources of data, is the ability to manipulate the content after it has been captured; these manipulations may have different purposes, notably artistic, task-based and forensic. For instance, it would be possible for users to change, in real time, focus, field of depth and stereo baseline, as well as the viewer perspective. Such media interactions and experiences are not available with conventional imaging formats that would be obtained by using the conventional standard image or video codecs to encode/decode light field based images.

It would hence be desirable to provide a technique for encoding/decoding light field based images that would not show these drawbacks of the prior art. Notably, it would be desirable to provide such a technique, which would allow a finer rendering of objects of interest of decoded images obtained from light field based images.

3. SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method for predicting at least one block of pixels of a view belonging to a matrix of views obtained from light-field data associated with a scene.

Such method is implemented by a processor and comprises for at least one pixel to predict of said block of pixels:
from said matrix of views, obtaining at least one epipolar plane image (EPI) to which said at least one pixel to predict belongs,
among a set of bidirectional prediction modes, determining at least one optimal bidirectional prediction mode from a set of previous reconstructed pixels neighbouring said at least one pixel to predict in said at least one epipolar plane image,
obtaining a prediction value of said at least one pixel to predict by performing an interpolation using said at least one optimal bidirectional prediction mode.

The present disclosure thus relies on a novel and inventive approach for predicting at least one block of pixels of a view belonging to a matrix of views obtained from light-field data associated with a scene. Actually, the present disclosure benefits from the specific properties of the linear structures inside an epipolar plane image.

More precisely, and as disclosed by B. Goldluecke et al. in "*The Variational Structure of Disparity and Regularization of 4D Light Fields*" pp 1003-1010 2013 IEEE Conference on Computer Vision and Pattern Recognition, a horizontal (respectively a vertical) epipolar plane image is a 2D image, built by stacking all images of a matrix of views along a line (respectively a column) of views of said matrix of view, on top of each other, and corresponds to a cut through the obtained stack along a same line of each stacked view (respectively along a same column of each stacked view).

It has to be noted that another orientation different from horizontal or vertical can be used for obtaining the corresponding EPI.

In other words, according to present disclosure, said at least one epipolar plane image (EPI) is a horizontal epipolar plane image (EPI), a vertical epipolar plane image (EPI) or an epipolar plane image (EPI) presenting an angular orientation with respect to a horizontal or vertical epipolar plane image (said angular orientation being predetermined or not).

Determining at least one optimal bidirectional prediction mode (according two directions of prediction), among a set of bidirectional prediction modes (predetermined or not), from a set of previous reconstructed pixels neighbouring said at least one pixel to predict in said at least one epipolar plane image, permits to take advantage of the inter-views correlations accurately, i.e. with a pixel (or a group of pixels smaller than a block of pixels) resolution, which is not possible according to the predicting methods of the prior art such as the one of the H.264 standard.

As a consequence, thanks to the predicting mode of the present disclosure based on the Epipolar Plane images, it is possible to provide a prediction mode, which is more optimal with respect to the specificities of plenoptic imaging providing matrix of views.

It has to be noted that B. Goldluecke in "The Variational Structure of Disparity and Regularization of 4D Light Fields" does not aim nor suggest to use epipolar plane images for optimizing the prediction of pixels during an encoding/decoding process, but use epipolar plane images for deriving differential constraints on a vector field on epipolar plane image space to enable consistent disparity field related to the regularization of more general vector-valued functions on the 4D ray space of the light field.

Using epipolar plane images permits to exploit the properties of the four-dimensional (4D) light field of the scene, since their building is based on the stacking of views representing the light from different viewpoints of that scene, i.e. viewpoints of a same line of the matrix of views for a horizontal epipolar plane image, of a same column of the matrix of views for a vertical epipolar plane image, or of a same set of views of said matrix of views presenting an angular orientation with respect to a line or a column of said matrix of views.

According to a first embodiment of the present disclosure, said determining said optimal bidirectional prediction mode comprises, for at least one pixel to predict of said block of pixels:
applying, each bidirectional prediction mode of said set of bidirectional prediction modes, to said set of previous reconstructed pixels neighbouring said at least one pixel to predict in said at least one epipolar plane image to obtain an energy level for each bidirectional prediction mode,
selecting said optimal bidirectional prediction mode corresponding to the bidirectional prediction mode of which the energy level is the argument of the minimum of energy levels obtained for each bidirectional prediction mode.

In other words, each bidirectional prediction mode is associated with two opposite directions for interpolating the prediction value of said at least one pixel to predict from a set of previous reconstructed pixels neighbouring said at least one pixel to predict in said at least one epipolar plane image.

Indeed, light field is defined on ray space, and implicitly represents scene geometry data in a rich structure, which becomes visible on its epipolar plane images. Thus, epipolar plane images present specific directional structures. According to the present disclosure, the selected optimal bidirectional prediction mode corresponds to the bidirectional prediction mode, which is the most adapted with respect to the directional structure of the considered epipolar plane image used for the pixel to predict of the considered block of pixels.

According to a second embodiment, the method for predicting of the present disclosure further comprises providing at least one group of pixels to predict within said block of pixels, said group of pixels comprising at least two pixels of a same line, of a same column or of a set of at least two pixels presenting an angular orientation with respect to a line or a column of said block of pixels, wherein determining said optimal bidirectional prediction mode comprises:

for at least one pixel to predict of said group of pixels, applying, each bidirectional prediction mode of said set of bidirectional prediction modes, to said set of previous reconstructed pixels neighbouring said at least one pixel to predict in said at least one epipolar plane image to obtain an energy level for each bidirectional prediction mode, selecting a same optimal bidirectional prediction mode for all pixels to predict belonging to said group of pixels, said optimal bidirectional prediction mode corresponding to the bidirectional prediction mode of which the energy level is the argument of the minimum of energy levels obtained for at least one pixel to predict of said group of pixels.

According to such an embodiment, the implemented selection is robust since a single optimal bidirectional prediction mode is obtained for all pixels to predict belonging to said group, such optimal bidirectional prediction mode presenting the energy level, which is the argument of the minimum of energy levels obtained for each bidirectional prediction mode and for at least one pixel to predict of said group of pixels.

In other words, the selection is done by taking into account more obtained energy levels than the ones taken into account in the previous embodiment, where the selection of the optimal bidirectional prediction mode is performed so that an optimal bidirectional prediction mode is obtained per pixel to predict and not for all pixels to predict belonging to said group of pixels.

According to a particular aspect of said second embodiment, said set of bidirectional prediction modes comprises a "DC" bidirectional prediction mode, wherein a first prediction value associated with a first prediction direction of said "DC" bidirectional prediction mode is the mean value of pixels belonging to a first part of said set of previous reconstructed pixels neighbouring said group of pixels to predict in said at least one epipolar plane image, and wherein a second prediction value associated with a second prediction direction of said "DC" bidirectional prediction mode is the mean value of pixels belonging to a second part of said set of previous reconstructed pixels neighbouring said group of pixels to predict in said at least one epipolar plane image, said second part being the complementary part of said first part.

According to a particular aspect of the two preceding embodiments, said energy level corresponds to:

an absolute difference between each prediction value associated with each prediction direction of each bidirectional prediction mode of said set of bidirectional prediction modes, or a square absolute difference between each prediction value associated with each prediction direction of each bidirectional prediction mode of said set of bidirectional prediction modes.

According to a first variant of the two preceding embodiments, when at least two epipolar plane images (EPI), to which one pixel to predict belongs, are corresponding, to a horizontal epipolar plane image (EPI) and a vertical epipolar plane image (EPI), or to a set of different angular orientations epipolar plane images (EPI), determining said optimal bidirectional prediction mode is performed, for said horizontal epipolar plane image (EPI) and for said vertical epipolar plane image (EPI), or for said set of different angular orientations epipolar plane images (EPI), said optimal bidirectional prediction mode corresponding to the bidirectional prediction mode of which the energy level is the argument of the minimum of energy levels obtained for each epipolar image.

According to a second variant of the two preceding embodiments, when at least two epipolar plane images (EPI), to which one pixel to predict belongs, are corresponding, to a horizontal epipolar plane image (EPI) and a vertical epipolar plane images (EPI), or to a set of different angular orientations epipolar plane images (EPI), an optimal bidirectional prediction mode is determined for each epipolar image and said prediction value of said at least one pixel to predict corresponds to a mean of at least two prediction values obtained respectively by using said optimal bidirectional prediction mode determined for each epipolar image.

The invention also relates to a method for encoding at least one block of pixels of a view belonging to a matrix of views obtained from light-field data associated with a scene. Such method is implemented by a processor and comprises:

predicting said at least one block of pixels according to the method for predicting as disclosed above to obtain a predicted block of pixels, determining a residual error corresponding to the difference between said at least one block of pixels and said predicted block of pixels, encoding said residual error associated with said block of pixels.

The prediction implemented during said encoding could of course comprise the different features of the predicting method according to the different embodiments or variants of the present disclosure as previously described.

According to a particular aspect of said method for encoding, said method for encoding further comprises:

inserting said residual error in a signal representing said matrix of views obtained from light-field data associated with said scene, inserting in said signal information representing at least one group of pixels to predict within said block of pixels.

Another aspect of the present disclosure pertains to a signal representing at least one block of pixels of a matrix of views obtained from light-field data associated with said scene said signal being obtained by said method for encoding as described above wherein information representing at least one group of pixels to predict within said block of pixels is inserted in said signal.

Another aspect of the present disclosure concerns a recording medium bearing a signal as described above.

Another aspect of the present disclosure pertains to a method for decoding a signal representing at least one block of pixels of a view belonging to a matrix of views obtained from light-field data associated with a scene.

Such method is implemented by a processor and comprises:

from said signal, decoding a residual error associated to said block of pixels, predicting said at least one block of pixels according to the method for predicting as disclosed above to obtain a predicted block of pixels, reconstructing said at least one block of pixels by adding said residual error to said predicted block of pixels.

Such a method for decoding is especially suited to decode a signal encoded according to the above-described encoding method.

In this way, the same prediction steps are performed as those performed when encoding so as to rebuilt the given block of pixels, and by optionally adding the prediction residue (transmitted in the signal) to the prediction.

In particular aspect of said method for decoding, it is possible to extract, from said signal, information representing at least one group of pixels to predict within said block of pixels, said predicting taking into account said information.

Another aspect of the present disclosure pertains to a device for encoding at least one block of pixels of a view belonging to a matrix of views obtained from light-field data associated with a scene, wherein said device comprises a processor configured to control:
- a module for predicting said at least one block of pixels, to obtain a predicted block of pixels, said module comprising, for at least one pixel to predict of said block of pixels:
  - an entity for obtaining, from said matrix of views, at least one epipolar plane image (EPI) to which said at least one pixel to predict belongs,
  - an entity for determining, among a set of bidirectional prediction modes, at least one optimal bidirectional prediction mode from a set of previous reconstructed pixels neighbouring said at least one pixel to predict in said at least one epipolar plane image,
  - an entity for obtaining a prediction value of said at least one pixel to predict by performing an interpolation using said at least one optimal bidirectional prediction mode.
- a module for determining a residual error corresponding to the difference between said at least one block of pixels and said predicted block of pixels,
- a module for encoding said residual error associated with said block of pixels.

Such an encoding device is adapted especially for implementing the method for encoding as described here above.

Another aspect of the present disclosure pertains to a device for decoding a signal representing at least one block of pixels of a view belonging to a matrix of views obtained from light-field data associated with a scene, wherein said device comprises a processor configured to control:
- a module for decoding a residual error associated to said block of pixels,
- a module for predicting said at least one block of pixels, to obtain a predicted block of pixels, said module comprising, for at least one pixel to predict of said block of pixels:
  - an entity for obtaining, from said matrix of views, at least one epipolar plane image (EPI) associated with said at least one pixel to predict,
  - an entity for determining, among a set of bidirectional prediction modes, at least one optimal bidirectional prediction mode from a set of previous reconstructed pixels neighbouring said at least one pixel to predict in said at least one epipolar plane image,
  - an entity for obtaining a prediction value of said at least one pixel to predict by performing an interpolation using said at least one optimal bidirectional prediction mode.
- a module for reconstructing said at least one block of pixels by adding said residual error to said predicted block of pixels.

Such a decoding device is adapted especially for implementing the method for decoding as described here above.

The disclosure relates thus to devices comprising a processor configured to implement the above methods.

According to other of its aspects, the disclosure relates to a computer program product comprising program code instructions to execute the steps of the above methods when this program is executed on a computer, a processor readable medium having stored therein instructions for causing a processor to perform at least the steps of the above methods, and a non-transitory storage medium carrying instructions of program code for executing steps of the above methods when said program is executed on a computing device.

The specific nature of the disclosure as well as other objects, advantages, features and uses of the disclosure will become evident from the following description of embodiments taken in conjunction with the accompanying drawings.

4. BRIEF DESCRIPTION OF DRAWINGS

In the drawings, an embodiment of the present disclosure is illustrated. It shows.

Similar or same elements are referenced with the same reference numbers.

5. DESCRIPTION OF EMBODIMENTS

5.1 General Principle

The present disclosure proposes a new technique for encoding (or decoding) an image of matrix of views implementing a new type of prediction based on the Epipolar Plane Images (EPI) representation of a matrix of views.

More precisely, from the causal reconstructed pixels of Epipolar Plane Images (EPI) neighbouring a current pixel to predict and to encode, the best direction among bidirectional prediction modes is found, and subsequently used to interpolate the prediction value of said current pixel to predict and to encode.

The approach proposed in the present disclosure is thus able to cope with the specific properties of the linear structures inside the Epipolar Plane Images (EPI) and as a consequence suitable for exploiting the properties of the four-dimensional (4D) light field of the scene.

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for encoding/decoding a block of pixels of a view of a matrix of views but extends to the encoding/decoding of a sequence of matrix of views (plenoptic video) because each view of each matrix of views belonging to said sequence is sequentially encoded/decoded as described below.

5.2 the Prediction Method

Figure 5:
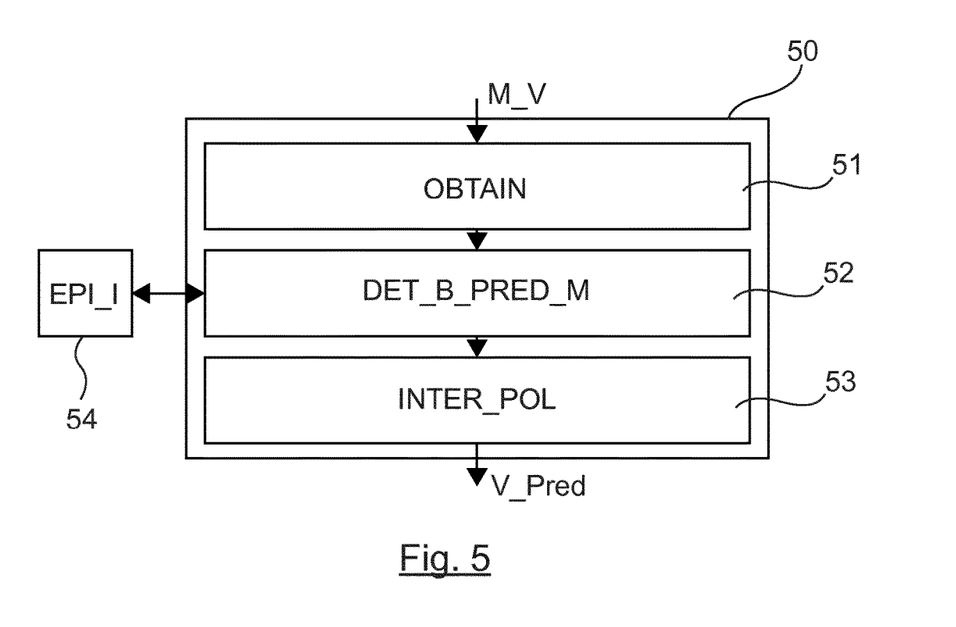
FIG. 5 shows schematically a diagram of the main steps of the method for predicting according to the present disclosure.

FIG. 5 shows schematically a diagram of the main steps of the method (50) for predicting according to the present disclosure, said method being performed by a module for predicting.

According to the present disclosure, the method (50) for predicting at least one block of pixels of a view (170) belonging to a matrix of views (17) obtained from light-field data associated with a scene, as represented on FIG. 3, is implemented by a processor and comprises, first, for at least one pixel to predict of said block of pixels, obtaining (51) at least one epipolar plane image (EPI) associated with said at least one pixel to predict by using an entity for obtaining. The at least one pixel to predict belongs to the at least one epipolar plane image (EPI).

Figure 4:
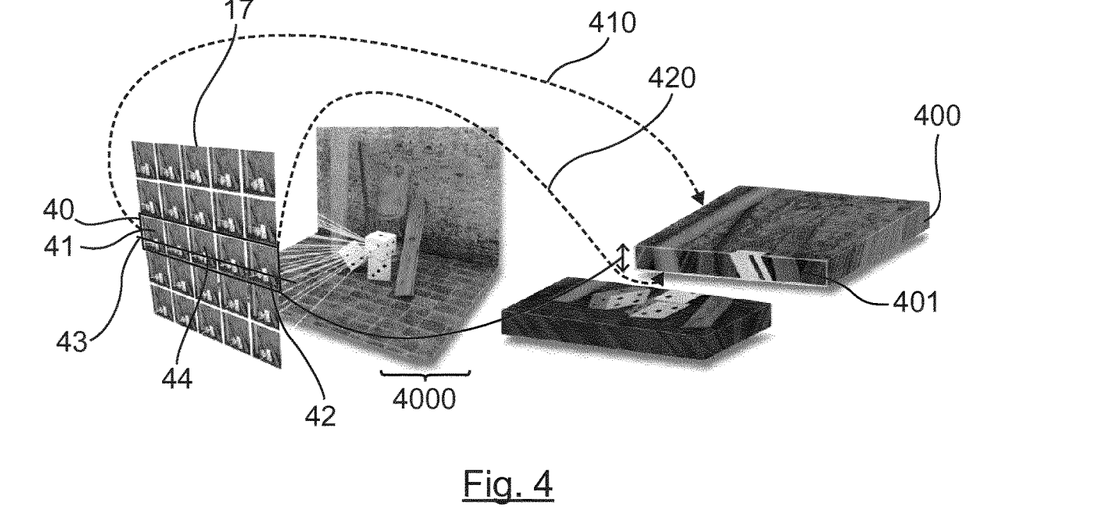
FIG. 4 shows the building of an epipolar plane image obtained from a matrix of views.

Said obtaining (51) is illustrated by FIG. 4 and disclosed by B. Goldluecke et al. in "*The Variational Structure of Disparity and Regularization of 4D Light Fields*" pp 1003-1010 2013 IEEE Conference on Computer Vision and Pattern Recognition.

The matrix of views (17) represents a 4D light field as a collection of images of a scene (4000), where the focal points of the cameras lie in a 2D plane.

Obtaining (51) an epipolar plane image consists in stacking all images along a line (40) of view points on top of each other, i.e. the first image (41) of the line (40) is on the top of the stack (400) as represented by the arrow (410), whereas the last image (42) of the line (40) is below the stack (400) as represented by the arrow (420). Then, a cut (401) through this stack (400) is performed along the same line (43) of each view. Such a cut is a horizontal epipolar plane image (EPI).

In other words, considering a matrix of views composed of B×D views (in FIG. 4 B=D=5) of indexes v,u respectively in line and column, and each views of size L×C pixels, of indexes t, s respectively in line and column, the horizontal EPI, as represented on FIG. 4 $E_h^{v,t}$ with v=0, . . . , B−1 of size D×C is realized by stacking the $t^{th}$ row of all the $v^{th}$ sub-images. In other words, the epipolar plane image is a 2D image, built by stacking one over the other, the view lines (fixed t coordinate corresponding to the view line (43)) from all views along a line of the (u,v) plane of the matrix of views (17) (fixed v coordinate corresponding to the line (40)).

Similarly, the vertical EPI $E_v^{u,s}$ with u=0, . . . , D−1 of size L×B is realized by stacking the $s^{th}$ column of all the $u^{th}$ sub-images.

It has to be noted that another orientation different from horizontal or vertical can be used for obtaining the corresponding EPI.

Thus, the proposed disclosure provides for at least one pixel to predict of a considered block of pixels to predict of a view of a given matrix of views at least one epipolar plane image.

Said at least one epipolar plane image (EPI) can be a horizontal epipolar plane image (EPI), a vertical epipolar plane image (EPI) or an epipolar plane image (EPI) presenting a predetermined angular orientation with respect to a horizontal or vertical epipolar plane image.

It has to be noted that a considered pixel to predict can belong to at least two epipolar plane images (EPI) corresponding, to a horizontal epipolar plane image (EPI) and a vertical epipolar plane image (EPI), or to a set of different angular orientations epipolar plane images (EPI).

Once at least one epipolar plane image is obtained (51) for the considered pixel to predict, the determining (52) of at least one optimal bidirectional prediction mode, among a set of predetermined bidirectional prediction modes and from a set of previous reconstructed pixels neighbouring said at least one pixel to predict in said at least one epipolar plane image (54) is performed using an entity for determining.

Figure 6A:
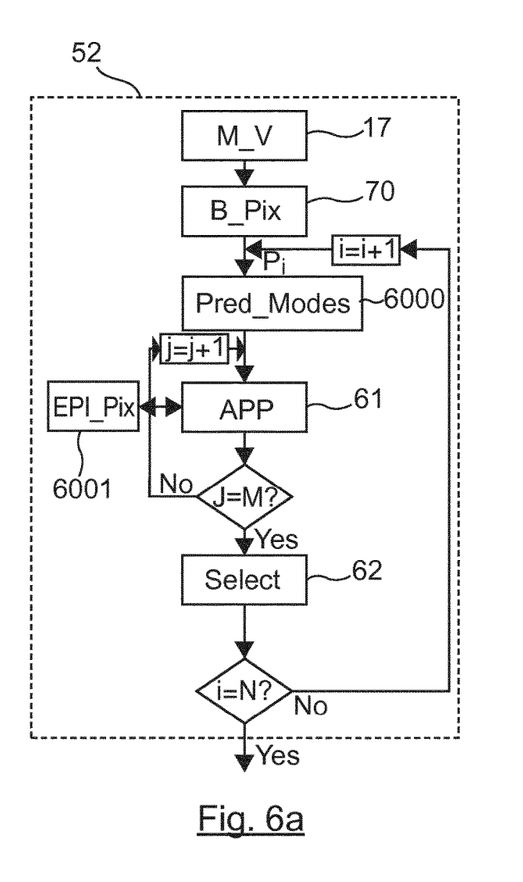
FIGS. 6*a* and 6*b* show schematically a diagram of the sub-steps of the determining of an optimal bidirectional prediction mode in accordance with two embodiments of the disclosure.
Figure 6B:
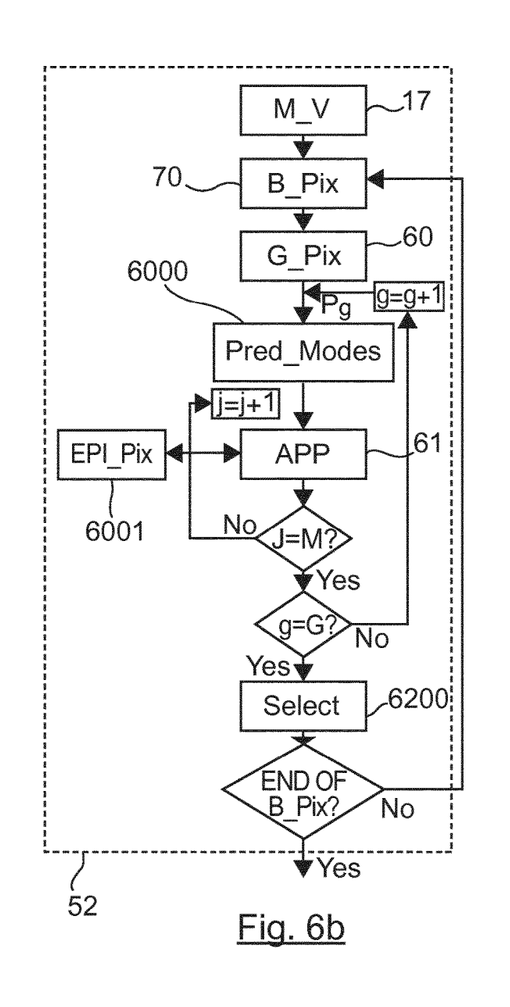

Two embodiments of said determining (52) are respectively illustrated in FIGS. 6a and 6b.

More precisely, according to the first embodiment as represented on FIG. 6a, for at least one pixel to predict of said block of pixels comprising N pixels, a selection (62) of an optimal bidirectional prediction mode is performed among a set (6000) of M predetermined bidirectional prediction modes.

In particular, according to the present disclosure, such selection is performed by taking into account a set (6001) of previous reconstructed pixels neighbouring said at least one pixel to predict in the at least one epipolar plane image to which the considered pixel to predict belongs.

Figure 7A:
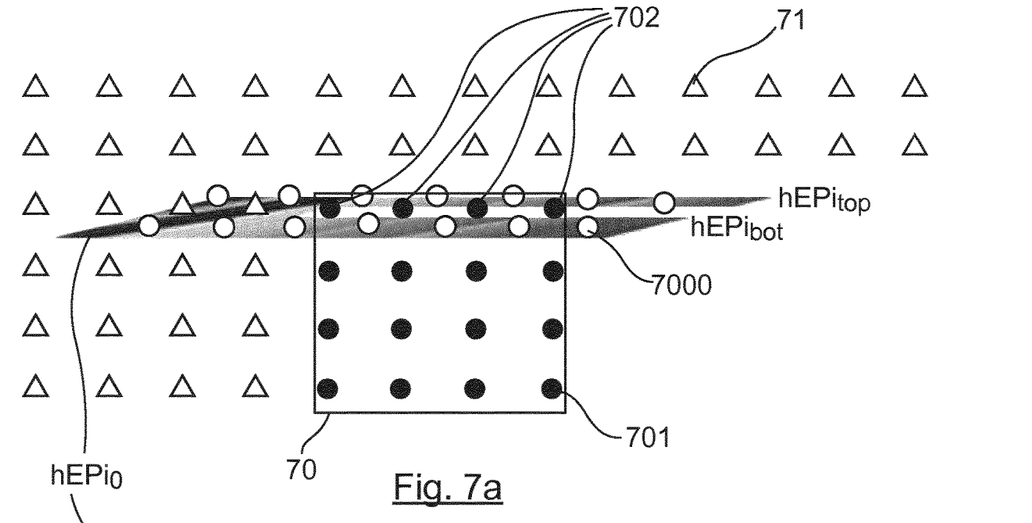
FIGS. 7*a* and 7*b* show respectively the prediction neighbouring of a pixel to predict in the given view and then in the considered epipolar plane image.
Figure 7B:
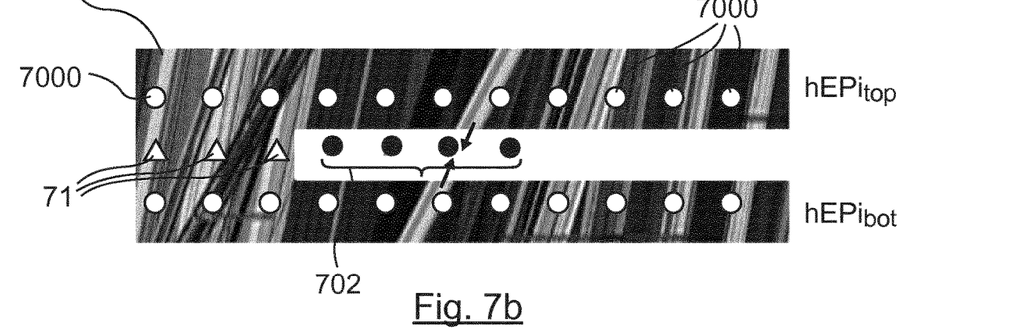

The prediction neighbouring of said at least one pixel to predict in the given view, and then only in the considered epipolar plane image is illustrated respectively by FIGS. 7a and 7b.

For example, the FIG. 7a represents the intermediate view (44) of the lines of views (40) of the matrix of view (17) as represented in FIG. 4.

In particular, in said view (44) of size L×C pixels, where L=6 (6 lines) and C=13 (13 columns), the block of pixels (70) is considered. Such a block (70) is for example surrounded by pixels (71), represented by triangles, which are previously reconstructed pixels of said view (44).

In addition, and advantageously according to the present disclosure, the pixels (701) of the block of pixels (70) to predict are also surrounded by pixels (7000) in a horizontal epipolar plane image, which are also previously reconstructed pixels, represented by bold points. Such epipolar plane images permits to exploit the properties of the four-dimensional (4D) light field of the scene.

As explained before regarding the obtaining (51) of an epipolar plane image, a different horizontal (respectively vertical) image is obtained for each line (respectively column) of the considered view. In other words, the pixels 702 located in the upper line of the considered block 70 belongs to the horizontal epipolar plane image $hEPI_0$.

According to a first variant of the present invention, for each pixels belonging to said block of pixels (70) a prediction value is extrapolated by using at least one optimal bidirectional prediction mode determined from a set of previous reconstructed pixels neighboring said pixel to predict in said at least one epipolar plane image.

Thus, according to this first variant, all the pixels to predict of the block of pixels (70) are predicted in the dimension corresponding to the epipolar plane images.

According to a second variant, a prediction value is extrapolated by using at least one optimal bidirectional prediction mode determined from a set of previous reconstructed pixels neighboring a considered pixel to predict in said at least one epipolar plane image for only a first part of the pixels belonging to said block of pixels (70).

Once prediction values are obtained, using epipolar plane images, for said first part of the pixels belonging to said block of pixels (70), said prediction values are then used to predict the other part of pixels belonging to said block of pixels (70) for which no prediction value has been yet obtained.

Said prediction of the other part of pixels belonging to said block of pixels (70) for which no prediction value has been yet obtained is performed by using classical prediction modes derived for example from the intra prediction modes of the H. 264 standard (nevertheless requiring that a side information corresponding to this intra prediction mode is transmitted to the decoder) or more simply by using a spatial interpolation (requiring less side information, since the decoder can know by default that such a spatial interpolation have to be performed once a part of the pixels to predict have been reconstructed using epipolar plane images).

More precisely, according to a spatial interpolation, the prediction value of a pixel to predict corresponds for example to the average, or a weighting, of the values of two or more pixels neighboring it directly or not, said neighboring pixels being already reconstructed (71) or belonging to said first part and being thus already associated to a prediction value.

For example, according to an horizontal (respectively vertical) spatial interpolation, the prediction value of a pixel to predict corresponds for example to the average, or a weighting, of the values of two or more pixels, already associated to a prediction value or being already reconstructed, directly neighboring it horizontally (respectively vertically).

In this case wherein spatial interpolation is performed, a prediction value can also be obtained for pixels to predict neighboring directly said block (70) of pixels (for example the pixels to predict of a line of pixels to predict located directly beneath said block (70) by using epipolar plane images so that during the following spatial interpolation a pixel to predict of said block (70) is neighbored by the number of pixels, already associated to a prediction value or being already reconstructed, required to perform the spatial interpolation.

Thus, according to this second variant, a part of the pixels to predict of the block of pixels (70) are first predicted in the dimension corresponding to the epipolar plane images, and, the other part of pixels is predicted using a spatial interpolation preformed within the view without using any epipolar plane images.

For example, according to this second variant, for the considered block (70) of pixels to predict, a prediction value for one on two pixels is obtained by using a bidirectional prediction mode determined from epipolar plane images.

Thus, one on two pixels of the block (70) of pixels are remaining to predict. For these remaining pixels to predict, the extrapolation of a prediction value by using epipolar plane images can be replaced by using for example a horizontal spatial interpolation performed by using the set of reconstructed pixels (71) of the considered view and the pixels of said block (70) of pixels for which a prediction value has been obtained by using epipolar plane images.

For some of the remaining pixels to predict of said block (70) of pixels, it is possible that no prediction value can be obtained. In this case, the pixels of the remaining pixels for which a prediction value has been obtained are then used in a following iteration to predict the remaining pixels to predict of said block (70) by using in this case a vertical interpolation and so on.

Considering a bidirectional prediction, it can be seen that the four pixel 702 located in the upper line of the considered block 70 are surrounded by previously reconstructed pixels (7000) in the horizontal epipolar plane image, which can be divided into two parts a part on the top $hEPI_{top}$ and a part at the bottom $hEPI_{bot}$ of these four pixels to predict 702.

FIG. 7b represents only the pixels 702 to predict of the first line of the considered block 70 surrounded by the previously reconstructed pixels (7000) in the horizontal epipolar plane image $hEPI_0$. As already explained, among such previously reconstructed pixels (7000), some reconstructed pixels 71, represented by triangles, belong to the same view in the same line as the pixels 702 to predict. It can be seen that the set (7000) of previous reconstructed pixels neighbouring the pixels to predict 701 corresponds to a "U zone" comprising a zone on the top, the part $hEPI_{top}$, a zone on the left with the reconstructed pixels 71 belonging to the same view as the pixel to predict 701, a zone on the bottom, the part $hEPI_{bot}$.

With respect to such an environment of the pixels 702 to predict in the horizontal epipolar plane image $hEPI_0$, the present disclosure uses new bidirectional prediction modes exploiting the specific directional properties of epipolar plane images.

Figure 8:
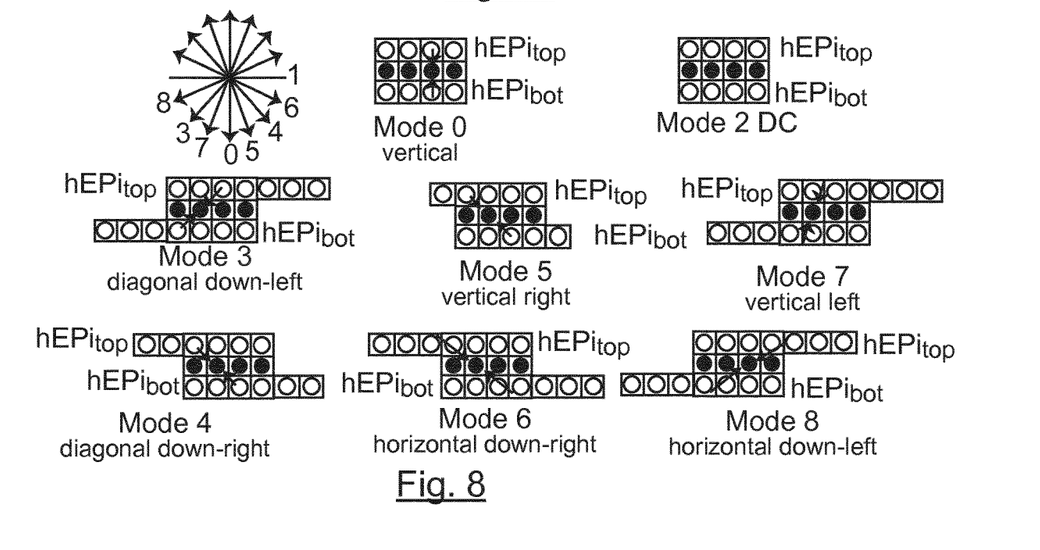
FIG. 8 shows an example of a set of predetermined bidirectional prediction modes.

An example of a set of predetermined bidirectional prediction modes is illustrated by FIG. 8. Others examples using the previously reconstructed pixels in an epipolar plane image could be easily derived. As can be seen, according to all these bidirectional prediction modes, the two prediction directions are illustrated by two arrows starting from the previously reconstructed pixels located respectively in the top part $hEPI_{top}$ and in the bottom part $hEPI_{bot}$ of the epipolar plane image $hEPI_0$.

Such examples of bidirectional prediction modes can be considered as being similar to the ones disclosed by the intra 4×4 prediction of the H. 264 standard, but it has to be well noticed that according to the present disclosure such modes are defined by using the previously reconstructed pixels in an epipolar plane image, which permits to exploit the properties of a the four-dimensional (4D) light field of the scene.

In addition, it can be seen that the mode 1 of the intra 4×4 prediction of the H. 264 is not adapted for the prediction according to the present disclosure directed to bidirectional prediction modes.

The prediction value of luminance associated with each prediction direction of each predetermined bidirectional prediction mode are built as following (see FIG. 8):

top directions of each mode (i.e. the arrow starting from previously reconstructed pixels located respectively in the top part $hEPI_{top}$ and in the bottom part $hEPI_{bot}$ of the epipolar plane image $hEPI_0$):

mode 0 (vertical): $p(x,y)=p_0^{top}=p(x, -1)$
mode 3 (diagonal down left): $p(x,y)=p_3^{top}=(p(x, -1)+2*p(x+1, -1)+p(x+2, -1)+2)>>2$
mode 4 (diagonal down right): $p(x,y)=p_4^{top}=(p(x-2, 1)+2*p(x-1, 1)+p(x, 1)+2)>>2$ mode 5 (vertical right): $p(x,y)=p_5^{top}=(p(x-1, -1)+p(x, -1)+1)>>1$
mode 6 (horizontal down right): $p(x,y)=p_6^{top}=(p(x-1, -1)+2*p(x-2, -1)+p(x-3, -1)+2)>>2$
mode 7 (vertical left): $p(x,y)=p_7^{top}=(p(x, -1)+p(x+1, -1)+1)>>1$
mode 8 (horizontal down left): $p(x,y)=p_8^{top}=(p(x+1, -1)+2*p(x+2, -1)+p(x+3, -1)+2)>>2$ bottom directions of each mode (i.e. the arrow starting from previously reconstructed pixels located respectively in the top part $hEPI_{top}$ and in the bottom part $hEPI_{bot}$ of the epipolar plane image $hEPI_0$):

mode 0 (vertical): $p(x,y)=p_0^{bot}=p(x, 1)$
mode 3 (diagonal down left): $p(x,y)=p_3^{bot}=(p(x, 1)+2*p(x-1,1)+p(x-2, 1)+2)>>2$
mode 4 (diagonal down right): $p(x,y)=p_4^{bot}=(p(x+2, 1)+2*p(x+1, 1)+p(x, 1)+2)>>2$
mode 5 (vertical right): $p(x,y)=p_5^{bot}=(p(x+1, 1)+p(x, 1)+1)>>1$
mode 6 (horizontal down right): $p(x,y)=p_6^{bot}=(p(x+1, 1)+2*p(x+2, 1)+p(x+3, 1)+2)>>2$
mode 7 (vertical left): $p(x,y)=p_7^{bot}=(p(x, +1)+p(x-1, 1)+1)>>1$
mode 8 (horizontal down left): $p(x,y)=p_7^{bot}=(p(x-1, 1)+2*p(x-2, 1)+p(x-3, 1)+2)>>2$ where:
"p(x,y)" the current pixel to predict of coordinates (0,0), (1,0), (2,0) and (3,0) respectively for the four pixels 701 of FIG. 7b.
"*" corresponds to the operator multiplication
">>n" being an integer division by $2^n$.

It has to be noted that the directions of prediction according to the present disclosure are not limited to the eight directions as represented in FIG. 8. Other directions are possible with adapted equations for obtaining prediction values.

With respect to the first embodiment of the determining (52) as represented on FIG. 6a, such determining (52) comprises applying (61) each predetermined bidirectional prediction mode of said set of predetermined bidirectional prediction modes, to said set (7000) of previous reconstructed pixels neighbouring said at least one pixel to predict in said at least one epipolar plane image to obtain an energy level for each bidirectional prediction mode.

Such energy levels correspond to spatial gradients between the two direction (i.e. the arrows on coming from the top part $hEPI_{top}$ and the other coming from the bottom part bottom part $hEPI_{bot}$) associated to each bidirectional prediction mode.

The step for calculating the energy level of spatial gradients is carried out on the previous reconstructed pixels neighbouring said at least one pixel to predict (701), said energy level corresponding to:

an absolute difference between each prediction value associated with each prediction direction of each predetermined bidirectional prediction mode of said set of predetermined bidirectional prediction modes:

$$E_d = |p_d^{top} - p_d^{bot}| \text{ with } d=0,3,4,5,6,7,8$$

or a square absolute difference between each prediction value associated with each prediction direction of each predetermined bidirectional prediction mode of said set of predetermined bidirectional prediction modes:

$$E_d = |p_d^{top} - p_d^{bot}|^2 \text{ with } d=0,3,4,5,6,7,8$$

Once the energy level for each bidirectional prediction mode (of index j among M prediction modes, for example in FIG. 8 M=8) is obtained (61), then the optimal bidirectional prediction mode is selected.

Such a selection (63) consists in detecting the directions having spatial gradients with lower energy levels, such energy levels being computed in a collinear manner to the potential contours as described above.

In other words the optimal bidirectional prediction mode corresponds to the bidirectional prediction mode of which the energy level is the argument of the minimum of energy levels obtained for each bidirectional prediction mode such as:

$$d_{opt} = \text{Arg } \min_{d}\{E_d\} \text{ with } d = 0, 3, 4, 5, 6, 7, 8.$$

Indeed, if the contour neighbouring the pixel to predict in the epipolar plane image is a vertical contour, the luminance prediction value $p_0^{top}$ and the luminance prediction value $p_0^{bot}$ will be close, leading to a very low value of energy $E_0$.

With respect to the first embodiment of FIG. 6a, for at least one pixel to predict (of index i among N pixels of said block of pixels), a selection (62) of an optimal bidirectional prediction mode is performed among a set (6000) of M predetermined bidirectional prediction modes.

According to a second embodiment illustrated by FIG. 6b, the method for predicting of the present disclosure further comprises providing (60) at least one group of pixels G_Pix to predict within said block of pixels B_Pix, said group of pixels G_Pix comprising at least two pixels Pg of a same line, of a same column, or of a set of at least two pixels presenting a predetermined angular orientation with respect to a line or a column of said block of pixels.

In the following, it is considered that said group of pixels G_Pix comprises G pixels. For example, such a group of pixels G_Pix can correspond to the four pixels Pg 702 to predict of the same line as represented in FIG. 7b.

The second embodiment of FIG. 6b differs from the first embodiment of FIG. 6a by the step of selecting (6200). Indeed, according to the second embodiment, a same optimal bidirectional prediction mode is selected (6200) for all pixels to predict belonging to said group of pixels, said optimal bidirectional prediction mode corresponding to the bidirectional prediction mode of which the energy level is the argument of the minimum of energy levels obtained for at least one pixel to predict of said group of pixels.

In other words, in this second embodiment, the optimal bidirectional prediction mode is selected, for all the pixels belonging to said group of pixels G_Pix, by taking into account M×G energy levels, whereas in the first embodiment a optimal bidirectional prediction mode is selected per pixel to predict by taking into account M energy levels.

According to a particular aspect of this second embodiment providing (60) at least one group of pixels G_Pix to predict within said block of pixels B_Pix, said set (6000) of predetermined bidirectional prediction modes further comprises a mode 2 corresponding to "DC" bidirectional prediction mode, where a first prediction value $p_2^{top}$ associated with a first prediction direction of said "DC" bidirectional prediction mode is the mean value of pixels belonging to the top part $hEPI_{top}$ of said set (7000) of previous reconstructed pixels neighbouring said group of pixels G_Pix to predict in said at least one epipolar plane image, and where a second prediction value $p_2^{bot}$ associated with a second prediction direction of said "DC" bidirectional prediction mode is the mean value of pixels belonging to the bottom part $hEPI_{bot}$ of said set (7000) of previous reconstructed pixels neighbouring said group of pixels G_Pix to predict in said at least one epipolar plane image, said second part being the complementary part of said first part.

According to a first variant of these two embodiments illustrated by FIGS. 6a and 6b, when at least two epipolar plane images (EPI) corresponding, to a horizontal epipolar plane image (EPI) and a vertical epipolar plane image (EPI), or to a set of different angular orientations epipolar plane images (EPI), and to which the one pixel to predict belongs, determining (52) said optimal bidirectional prediction mode is performed for said horizontal epipolar plane image (EPI) and for said vertical epipolar plane image (EPI), or for a set of different angular orientations epipolar plane images (EPI), said optimal bidirectional prediction mode corresponding to the bidirectional prediction mode of which the energy level is the argument of the minimum of energy levels obtained for each epipolar plane image such as:

$$d_{opt}^o = \text{Argmin}_{d,o}\{E_{d,o}\} \text{ with } d = 0, 3, 4, 5, 6, 7, 8 \text{ and}$$

$$o = \text{vertical or horizontal } EPI.$$

In the same case, according to a second variant of the two preceding embodiments, the optimal bidirectional prediction mode is determined (52) for each epipolar plane image and said prediction value of said at least one pixel to predict corresponds to a mean of at least two prediction values obtained respectively by using said optimal bidirectional prediction mode determined for each epipolar plane image.

Once at least one optimal bidirectional prediction mode is determined (52) according to one of the two embodiments illustrated by FIGS. 6a and 6b, a luminance prediction value $p_{pred}(x,y)$ of said at least one pixel to predict is obtained (53) by performing an interpolation using said at least one optimal bidirectional prediction mode as following:

$$p_{pred}(x,y) = (p_{dopt}^{top}(x,y) + p_{dopt}^{bot}(x,y) + 1) >> 1.$$

Said interpolation is performed by an entity for interpolating.

Considering the first embodiment, for example, the modes 0 ($d_{opt}=0$), 3 ($d_{opt}=3$), 5 ($d_{opt}=5$) and 8 ($d_{opt}=8$) will be selected respectively for the pixels to predict of coordinates (0,0), (1,0), (2,0) and (3,0):

p(0,0)=p$_0$=(p(0, −1)+p(0, 1)+1)>>1,
p(1,0)=p$_3$=((p(1, −1)+2*p(2, −1)+p(3, −1)+2)>>2+(p(1,1)+2*p(0,1)+p(−1,1)+2)>>2+1)>>1
p(2,0)=p$_5$=((p(1, −1)+p(2, −1)+1)>>1+(p(3, +1)+p(2,1)+1)>>1+1)>>1
p(3,0)=p$_8$=((p(4, −1)+2*p(5, −1)+p(6, −1)+2)>>2+(p(2,1)+2*p(1,1)+p (0,1)+2)>>2+1)>>1 or
p(1,0)=p$_3$=(p(1, −1)+2*p(2, −1)+p(3, −1)+p(1,1)+2*p(0,1)+p(−1,1)+4)>>3
p(2,0)=p$_5$=(p(1, −1)+p(2, −1)+p(3, +1)+p(2,1)+2)>>2
p(3,0)=p$_8$=(p(4, −1)+2*p(5, −1)+p(6, −1)+p(2,1)+2*p(1, 1)+p (0,1)+4)>>3

Considering the second embodiment, for example, the single mode 0 ($d_{opt}=0$) will be selected respectively for the four pixels to predict of coordinates (0,0), (1,0), (2,0) and (3,0):

p(0,0)=p$_0$=(p(0, −1)+p(0, 1)+1)>>1,
p(1,0)=p$_0$=(p(1, −1)+p(1, 1)+1)>>1
p(2,0)=p$_0$=(p(2, −1)+p(2, 1)+1)>>1, and
p(3,0)=p$_0$=(p(3, −1)+p(3, 1)+1)>>1.

5.3 the Encoding Method

The prediction technique as previously described can be used by a matrix of view encoder. Indeed, the present disclosure aims at providing a method for encoding (respectively decoding) an image of matrix of views and for this goal uses a new type of prediction, as disclosed above, based on the Epipolar Plane Images (EPI) representation of the matrix of views.

Such a new type of prediction based on Epipolar Plane images (EPI) is for example automatically chosen among others classical types of prediction using a Rate Distortion Optimization criterion as disclosed by T. Wiegand et al. in "*Lagrange Multiplier Selection in Hybrid Video Coder Control*" pp 542-545 vol. 3 IEEE International Conference on Image processing 2001.

Figure 9:
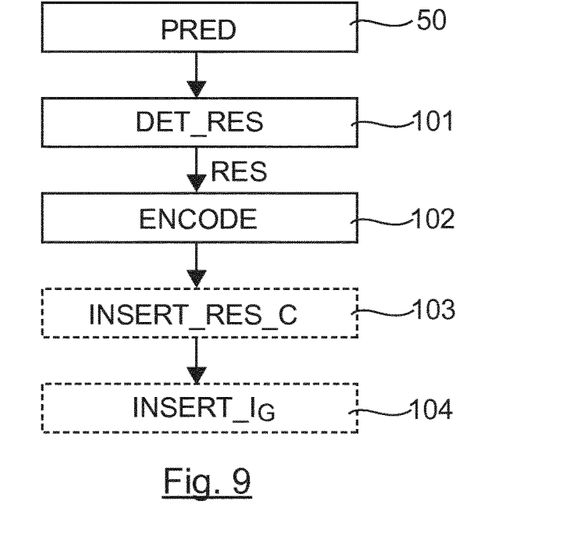
FIG. 9 shows schematically a diagram of the steps of the method for encoding according to the present disclosure.

Referring to FIG. 9, in one particular embodiment, such an encoder implements the following steps for a matrix of view obtained from light-field data associated with a scene:

- predicting (50) said at least one block of pixels according to the method for predicting as described above to obtain a predicted block of pixels,
- determining (101) a residual error corresponding to the difference between said at least one block of pixels and said predicted block of pixels, by using a module for determining,
- encoding (102) said residual error associated with said block of pixels, by using a module for encoding.

During the encoding (102) the residual error is transformed and quantized and finally entropy coded.

Optionally (as represented in dotted lines), the method for encoding further comprises:

- inserting (103) said encoded residual error in a signal representing said matrix of views obtained from light-field data associated with said scene,
- inserting (104) in said signal information representing at least one group of pixels to predict within said block of pixels.

In particular, such option is implemented when the second embodiment of the predicting method is performed. A particular signal is thus obtained comprising information representing at least one group of pixels to predict within said block of pixels.

5.4 the Decoding Method

Figure 10:
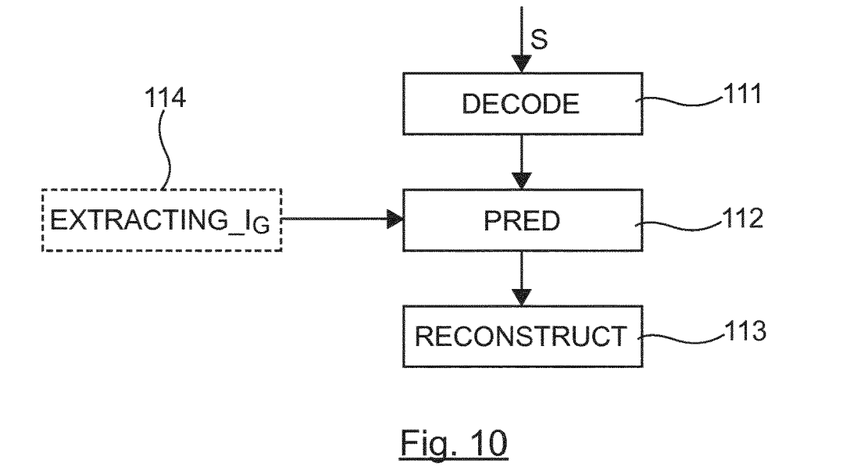
FIG. 10 shows schematically a diagram of the steps of the method for decoding according to the present disclosure.

Referring now to FIG. 10, the main steps of decoding implemented in a decoder suitable for decoding matrix of views are presented.

It is assumed that the decoder receives signal representing a matrix of views encoded for example according to the encoding method described her above.

FIG. 9 shows a decoding method in which the signal optionally (as represented in dotted lines) comprises at least one prediction residue and information representing at least one group of pixels to predict within said block of pixels.

Thus, in this embodiment, the method of decoding according to the invention comprises:

- from said signal, decoding (111) a residual error associated to said block of pixels using a module for decoding,
- predicting (112) said at least one block of pixels according to the method for predicting according to any one of claims 1 to 8 to obtain a predicted block of pixels, by using a module for predicting,
- reconstructing (113) said at least one block of pixels by adding said residual error to said predicted block of pixels, by using a module for reconstructing, and further comprises extracting (114), from said signal, information representing of at least one group of pixels to predict within said block of pixels, said predicting taking into account said information.

During the decoding (111), the residual error is inverse transformed and dequantized reciprocally to the process performed during the encoding.

5.5 Structures of the Module for Predicting, Encoder and Decoder

On FIGS. 5, 6a and 6b, 9 and 10, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 11:
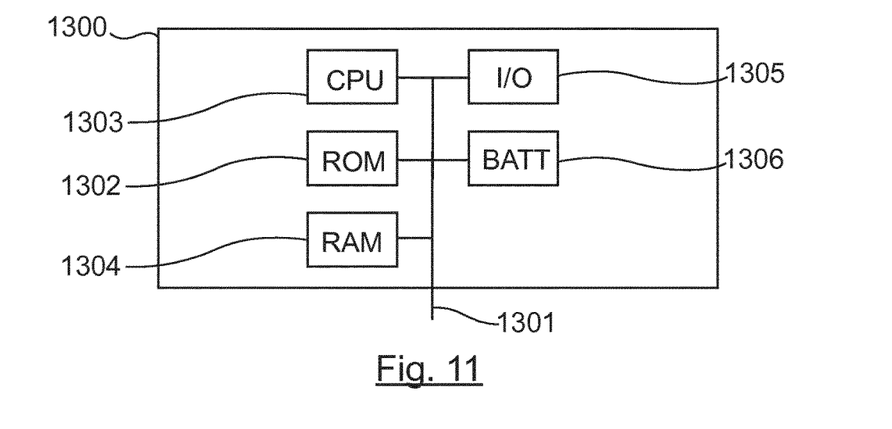
FIG. 11 shows an example of architecture of a device in accordance with an embodiment of the disclosure.

FIG. 11 represents an exemplary architecture of a device 1300 which may be configured to implement a predicting method described in relation with FIG. 1-8, an encoding method in relation with FIG. 9, or a decoding method in relation with FIG. 10.

Device 1300 comprises following elements that are linked together by a data and address bus 1301:

- a microprocessor 1303 (or CPU), which is, for example, a DSP (or Digital Signal Processor);
- a ROM (or Read Only Memory) 1302;
- a RAM (or Random Access Memory) 1304;
- an I/O interface 1305 for transmission and/or reception of data, from an application; and
- a battery 1306.

According to a variant, the battery 1306 is external to the device. Each of these elements of FIG. 11 are well-known by those skilled in the art and won't be disclosed further. In each of mentioned memory, the word «register» used in the specification can correspond to area of small capacity (some bits) or to very large area (e.g. a whole program or large amount of received or decoded data). ROM 1302 comprises at least a program and parameters. Algorithm of the methods according to the disclosure is stored in the ROM 1302. When switched on, the CPU 1303 uploads the program in the RAM and executes the corresponding instructions.

RAM 1304 comprises, in a register, the program executed by the CPU 1303 and uploaded after switch on of the device 1300, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment of encoding or encoder, said matrix of views is obtained from a source. For example, the source belongs to a set comprising:
- a local memory (1302 or 1304), e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface (1305), e.g. a wireline interface (for example a bus interface, a wide area network interface, a local area network interface) or a wireless interface (such as a IEEE 802.11 interface or a Bluetooth® interface); and
- a picture capturing circuit (e.g. a sensor such as, for example, a CCD (or Charge-Coupled Device) or CMOS (or Complementary Metal-Oxide-Semiconductor)).

According to different embodiments of the decoding or decoder, the decoded matrix of views is sent to a destination; specifically, the destination belongs to a set comprising:
- a local memory (1302 or 1304), e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface (1305), e.g. a wireline interface (for example a bus interface, a wide area network interface, a local area network interface) or a wireless interface (such as a IEEE 802.11 interface or a Bluetooth® interface); and
- a display.

According to different embodiments of encoding or encoder, a bitstream delivered by said encoder is sent to a destination. As an example, said bitstream is stored in a local or remote memory, e.g. a video memory (1304) or a RAM (1304), a hard disk (1302). In a variant, said bitstream is sent to a storage interface, e.g. an interface with a mass storage, a flash memory, ROM, an optical disc or a magnetic support and/or transmitted over a communication interface (1305), e.g. an interface to a point to point link, a communication bus, a point to multipoint link or a broadcast network.

According to different embodiments of decoding or decoder, a bitstream is obtained from a source. Exemplarily, the bitstream is read from a local memory, e.g. a video memory (1304), a RAM (1304), a ROM (1302), a flash memory (1302) or a hard disk (1302). In a variant, the bitstream is received from a storage interface, e.g. an interface with a mass storage, a RAM, a ROM, a flash memory, an optical disc or a magnetic support and/or received from a communication interface (1305), e.g. an interface to a point to point link, a bus, a point to multipoint link or a broadcast network.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for predicting at least one block of pixels of a view belonging to a matrix of views obtained from light-field data associated with a scene, the method being implemented by a processor and comprising for at least one pixel to predict of said block of pixels:

from said matrix of views, obtaining at least one epipolar plane image (EPI) to which said at least one pixel to predict belongs, among a set of bidirectional prediction modes, determining at least one optimal bidirectional prediction mode from a set of previous reconstructed pixels neighbouring said at least one pixel to predict in said at least one epipolar plane image, obtaining a prediction value of said at least one pixel to predict by performing an interpolation using said at least one optimal bidirectional prediction mode, and further comprising providing at least one group of pixels to predict within said block of pixels, said group of pixels comprising at least two pixels of a same line, of a same column or of a set of at least two pixels presenting an angular orientation with respect to a line or a column of said block of pixels, and wherein determining said optimal bidirectional prediction mode comprises:

for at least one pixel to predict of said group of pixels, applying, each predetermined bidirectional prediction mode of said set of bidirectional prediction modes, to said set of previous reconstructed pixels neighbouring said at least one pixel to predict in said at least one epipolar plane image to obtain an energy level for each bidirectional prediction mode, selecting a same optimal bidirectional prediction mode for all pixels to predict belonging to said group of pixels, said optimal bidirectional prediction mode corresponding to the bidirectional prediction mode of which the energy level is the argument of the minimum of energy levels obtained for at least one pixel to predict of said group of pixels.

2. The method of claim 1, wherein said energy level corresponds to spatial gradients between at least two directions belong to each bidirectional prediction mode.

3. The method for predicting according to claim 2, wherein, when at least two epipolar plane images (EPI), to which the one pixel to predict belongs, corresponding, to a horizontal epipolar plane image (EPI) and a vertical epipolar plane image (EPI), or to a set of different angular orientations epipolar plane images (EPI), determining said optimal bidirectional prediction mode is performed, for said horizontal epipolar plane image (EPI) and for said vertical epipolar plane image (EPI), or for said set of different angular orientations epipolar plane images (EPI), said optimal bidirectional prediction mode corresponding to the bidirectional prediction mode of which the energy level is the argument of the minimum of energy levels obtained for at least one epipolar image.

4. The method for predicting according to claim 2, wherein, when at least two epipolar plane images (EPI), to which one pixel to predict belongs, corresponding, to a horizontal epipolar plane image (EPI) and a vertical epipolar plane images (EPI), or to a set of different angular orientations epipolar plane images (EPI), an optimal bidirectional prediction mode is determined for each epipolar image and said prediction value of said at least one pixel to predict corresponds to a mean of at least two prediction values obtained respectively by using said optimal bidirectional prediction mode determined for at least two epipolar images.

5. A method for encoding at least one block of pixels of a view belonging to a matrix of views obtained from light-field data associated with a scene, the method being implemented by a processor and comprising:

predicting said at least one block of pixels according to the method for predicting according to claim 1 to obtain a predicted block of pixels, determining a residual error corresponding to the difference between said at least one block of pixels and said predicted block of pixels, encoding said residual error associated with said block of pixels.

6. A method for encoding according to claim 5 further comprising:

inserting said residual error in a signal representing said matrix of views obtained from light-field data associated with said scene, inserting in said signal information representing at least one group of pixels to predict within said block of pixels.

7. A method for decoding a signal representing at least one block of pixels of a view belonging to a matrix of views obtained from light-field data associated with a scene, the method being implemented by a processor and comprising:

from said signal, decoding a residual error associated to said block of pixels, predicting said at least one block of pixels according to the method for predicting according to claim 1 to obtain a predicted block of pixels, reconstructing said at least one block of pixels by adding said residual error to said predicted block of pixels.

8. A method for decoding according to claim 7 further comprising extracting from said signal information representing a forming of at least one group of pixels to predict within said block of pixels, said predicting taking into account information.

9. A device for encoding at least one block of pixels of a view belonging to a matrix of views obtained from light-field data associated with a scene, wherein said device comprises a processor configured to:

obtain a predicted block of pixels, and for each pixel to predict of said block of pixels:

obtain, from said matrix of views, at least one epipolar plane image (EPI) to which said at least one pixel to predict belongs, determine, among a set of bidirectional prediction modes, at least one optimal bidirectional prediction mode from a set of previous reconstructed pixels neighbouring said at least one pixel to predict in said at least one epipolar plane image, obtain a prediction value of said at least one pixel to predict by performing an interpolation using said at least one optimal bidirectional prediction mode, provide at least one group of pixels to predict within said block of pixels, said group of pixels comprising at least two pixels of a same line, of a same column or of a set of at least two pixels presenting an angular orientation with respect to a line or a column of said block of pixels, and wherein determining said optimal bidirectional prediction mode comprises:

for at least one pixel to predict of said group of pixels, apply each predetermined bidirectional prediction mode of said set of bidirectional prediction modes to said set of previous reconstructed pixels neighbouring said at least one pixel to predict in said at least one epipolar plane image to obtain an energy level for each bidirectional prediction mode, select a same optimal bidirectional prediction mode for all pixels to predict belonging to said group of pixels, said optimal bidirectional prediction mode corresponding to the bidirectional prediction mode of which the energy level is the argument of the minimum of energy levels obtained for at least one pixel to predict of said group of pixels, determine a residual error corresponding to the difference between said at least one block of pixels and said predicted block of pixels, encode said residual error associated with said block of pixels.

10. The device for encoding according to claim 9 wherein the processor is further configured to:

insert said residual error in a signal representing said matrix of views obtained from light-field data associated with said scene, insert in said signal information representing the at least one group of pixels to predict within said block of pixels.

11. A device for decoding a signal representing at least one block of pixels of a view belonging to a matrix of views obtained from light-field data associated with a scene, wherein said device comprises a processor configured to:

decode a residual error associated to said block of pixels, predict said at least one block of pixels, to obtain a predicted block of pixels, and for at least one pixel to predict of said block of pixels:

obtain, from said matrix of views, at least one epipolar plane image (EPI) to which said at least one pixel to predict belongs, determine, among a set of bidirectional prediction modes, at least one optimal bidirectional prediction mode from a set of previous reconstructed pixels neighbouring said at least one pixel to predict in said at least one epipolar plane image, obtain a prediction value of said at least one pixel to predict by performing an interpolation using said at least one optimal bidirectional prediction mode, provide at least one group of pixels to predict within said block of pixels, said group of pixels comprising at least two pixels of a same line, of a same column or of a set of at least two pixels presenting an angular orientation with respect to a line or a column of said block of pixels, and wherein determining said optimal bidirectional prediction mode comprises:

for at least one pixel to predict of said group of pixels, apply each predetermined bidirectional prediction mode of said set of bidirectional prediction modes to said set of previous reconstructed pixels neighbouring said at least one pixel to predict in said at least one epipolar plane image to obtain an energy level for each bidirectional prediction mode, select a same optimal bidirectional prediction mode for all pixels to predict belonging to said group of pixels, said optimal bidirectional prediction mode corresponding to the bidirectional prediction mode of which the energy level is the argument of the minimum of energy levels obtained for at least one pixel to predict of said group of pixels, reconstruct said at least one block of pixels by adding said residual error to said predicted block of pixels.

12. The device for decoding according to claim 11, wherein the processor is further configured to extract from said signal information representing a forming of the at least one group of pixels to predict within said block of pixels, said predicting taking into account the information.

13. A non-transitory computer-readable medium storing executable program instructions to cause a computer executing the instructions to perform a method according to claim 1.

* * * * *